July 2, 1940.  B. GERSTENBERGER ET AL  2,206,180
DEVICE FOR ILLUMINATING MICROSCOPIC OBJECTS
Filed Oct. 19, 1937
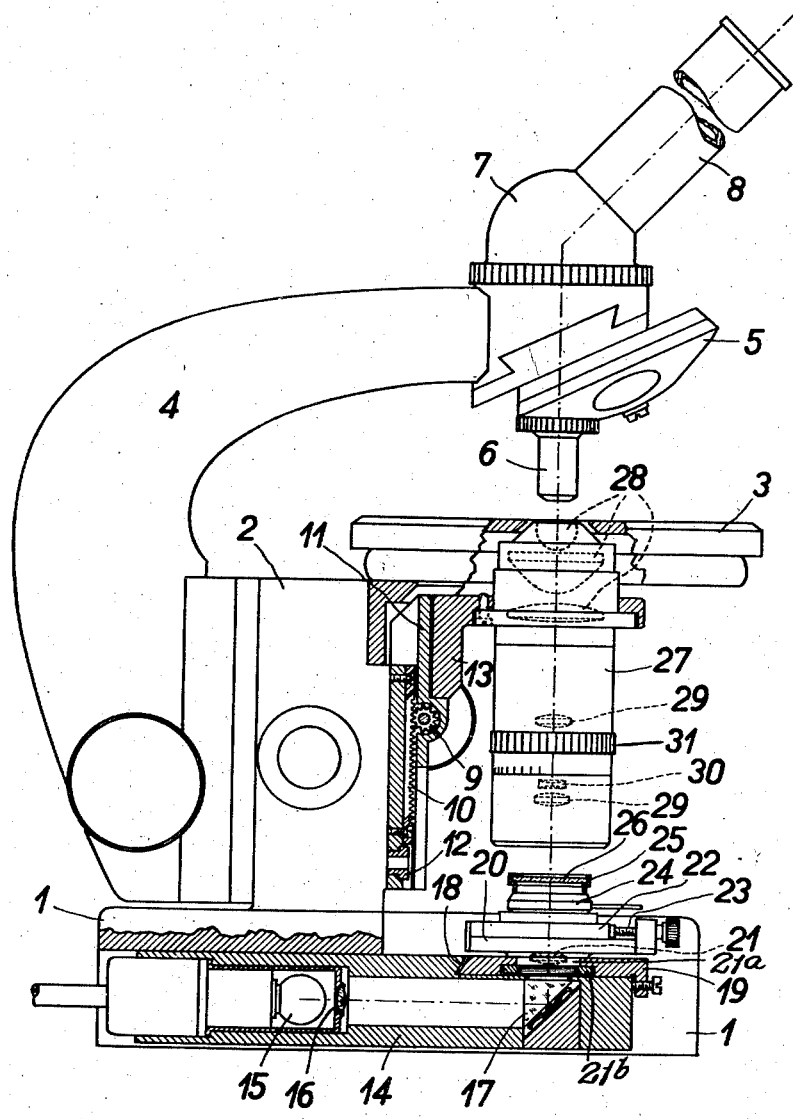
Inventors:
Bruno Gerstenberger
Max Hiebshmann
Robert Richter Patented July 2, 1940

2,206,180

UNITED STATES PATENT OFFICE 2,206,180

DEVICE FOR ILLUMINATING MICROSCOPIC OBJECTS

Bruno Gerstenberger, Max Hübschmann, and Robert Richter, Jena, Germany, assignors to the firm Carl Zeiss, Jena, Germany Application October 19, 1937, Serial No. 169,798
In Germany October 28, 1936

2 Claims. (Cl. 88—39)

An application has been filed in Germany, October 28, 1936.

The invention has reference to a device for illuminating microscopic objects which comprises a source of light, a lamp condenser, an additional optical system displaceable entirely or partly along the optical axis of the path of the illumination rays, and a microscope condenser, the device concerned being of the kind which illuminates the objects by transmitted light. In the known constructional form of the illumination device, the optical parts have a common housing which can be placed into the holder of the condenser of a microscope and contains a reflecting system for bending the path of the illumination rays at right angles. The number of the optical elements used and the necessity of these elements having definite distances apart make the device comparatively unwieldy. The device extends to considerably outside the margin of the object stage and handicaps microscoping when the bracket of the microscope stand is to be remote from the observer.

The invention, which aims at overcoming this disadvantage, dispenses with the said common housing and provides that the device consists of two separate constructional parts, the one of these parts, which comprises the source of light and the lamp condenser, being disposed in the base of the microscope, and the other of these parts, which comprises the pancratic reversing system and the microscope condenser, being fixed to that portion of the microscope stand which is above the base and below the stage. This other part is conveniently displaceable along the optical axis.

To use the same source of light also in dark-field microscopy, that part of the illumination device which is fixed above the base to the microscope stand is conveniently interchangeable with another condenser. This interchange need not, of course, be restricted to dark-field condensers but can be applied as well in the case of light-field condensers not permitting pancratic alterations in the illumination.

The known illumination device has, as a rule, a changeable diaphragm restricting the aperture of the pencil of illumination rays. A diaphragm of this kind is conveniently used also in devices constructed according to the invention. This diaphragm is preferably fixed to a support detachably so connected to the part in the microscope base as to constitute a slide which is similar to the sliding object changer frequently used in microscopes and can be displaced in a corresponding guide in the microscope base. The diaphragm can, accordingly, be removed from the ray path by a single manipulation when it is not required any longer on account of, for instance, an interchange of the one part of the device with a condenser having an aperture diaphragm. With a view to illuminating the object under examination by means of a pencil of illumination rays which is inclined, instead of symmetrical, to the axis of the illumination system, it is convenient to so mount the diaphragm on its support as to be displaceable at right angles to and rotatable about this axis, the pencil of the incident illumination rays being, accordingly, adjustable in a simple manner to any azimuth and angle of incidence.

The accompanying drawing shows in part-sectional elevation a constructional example of the new illumination device and a microscope.

The microscope shown in the drawing has a horse-shoe base 1 on which is mounted a pillar 2 supporting a stage 3 and connected to a bracket 4. To this bracket 4 are connected the optical observation parts, viz. a revoluble objective carrier 5 provided with objectives 6, and a head 7 rotatable about the optical axis and fast with an inclined eye-piece tube 8. Below the stage 3, the pillar 2 has a slide 11, which is displaceable at right angles to the surface of the stage 3 by means of a pinion 9 and a rack 10, and a sleeve 12 for holding one of the usual microscope mirrors. The slide 11 is so constructed as to hold in the known manner an exchangeable carrier 13 containing a microscope condenser.

The microscope base 1 contains a housing 14 which extends into the horse-shoe aperture. In this housing 14 is mounted an incandescent lamp 15 and a lamp condenser 16. That part of the housing 14 which is below the stage 3 contains a prism 17 deflecting the pencil of illumination rays upwardly at right angles. Above the prism 17 is a guide 18 for a slide changer 19. A slide guide 20 is provided with a mounting 21a for a collecting lens 21. Said mounting 21a is fixed to the slide guide 20, and both these parts are rotatable in the slide changer 19 about the axis of the lens 21, axial movement being prevented by a ring 21b threaded on the mounting 21a. In the slide guide 20, a slide 22 can be displaced at right angles to the axis of the lens 21 by means of a spindle 23. The slide 22 supports an iris diaphragm 24 provided with a mount 25 for light filters 26.

The remaining part of the illumination device constitutes another constructional part, which is disposed in a housing 27. The optical elements in this housing 27 are a three-lens condenser 28 and a pancratic reversing system which consists of two convergent lenses 29 displaceable along the optical axis and a stationary divergent lens 30 disposed between the said lenses 29. Displacements of the lenses 29 are effected by means of a milled head 31. The housing 27 is screwed to the carrier 13.

When the device is in use, the carrier 13 fast with the housing 27 is held by the slide 11. Rotating the pinion 9 causes the slide 11 to raise the carrier 13 to such an extent that the front lens of the microscope condenser 28 assumes its correct position in the aperture in the stage 3. The mount of the lamp condenser 16 acts as a luminous-field diaphragm, and the iris diaphragm 24 serves as an aperture diaphragm. The lamp condenser 16 images the filament of the incandescent lamp 15 approximately in the plane of the aperture diaphragm 24, and the reversing system 29, 30 images this image in the entrance aperture of the microscope condenser 28. The image of the luminous field is imaged by the collecting lens 21 in the neighbourhood of the reversing system 29, 30, and the microscope condenser 28 images this other image in the plane of the object. The image of the aperture diaphragm 24 lying in the entrance aperture of the microscope condenser 28, lateral displacements of the diaphragm 24 by means of the spindle 23 produce the sensation of a diaphragm situate in the entrance aperture being laterally displaced. Displacing the slide 22 from medial position entails, accordingly, a radial displacement of the pencil of imaging rays entering the microscope condenser 28, or, in other words, an inclination of the pencil of the rays illuminating the object. Accordingly, this inclined pencil can be given any desired azimuth by rotation of the lens mounting 21ᵃ and, consequently, of the slide guide 20 in the slide changer 19.

When dark-field observation is to be effected by means of the microscope, the carrier 13 and the housing 27 are replaced by a carrier 13 provided with a dark-field condenser. The slide changer 19 is removed from its guide 18, and observations are effected in the known manner through the agency of the incandescent lamp 15. In contrast to the usual practice of placing a source of light outside the microscope, which generally renders impossible observation from that side of the eye-piece which is remote from the bracket 4, the position the source of light assumes according to the invention does not entail any such restriction. If this advantage is renounced, the object can naturally be illuminated by a source of light outside the microscope, for instance an arc-lamp, provided of course that the sleeve 12 holds one of the usual microscope mirrors.

We claim:

1. In a microscope having a base, a stand, and an optical system comprising an objective and adapted to image objects on an enlarged scale, a device for illuminating said objects by transmitted light, said device comprising two tubular housings and means for restricting the aperture of the pencil of illumination rays, the axes of said housings intersecting each other, one of said two housings being mounted in said base and containing a source of light, a lamp condenser for producing an image of said source of light, the optical axis of said lamp condenser being parallel to the axis of said one housing, and a reflecting system for deviating the axis of the pencil of light rays into coincidence with the axis of said objective, the axis of the other of said housings being parallel to the axis of said objective, said other housing being attached to said stand and containing an optical reversing system of the pancratic type and a microscope condenser, the optical axes of said reversing system and said microscope condenser coinciding with the axis of said objective, said reversing system and said microscope condenser being so disposed relatively to each other that the image produced by said reversing system of first said image lies in the entrance aperture of said microscope condenser, the said means comprising guiding means connected to the base of said microscope, a support displaceably mounted in said guiding means, and a diaphragm connected to said support.

2. In a microscope according to claim 1, said guiding means being rotatably connected to the base of the said microscope, said diaphragm being displaceable in parallel to the plane of the diaphragm aperture and rotatable about an axis at right angles to said plane.

BRUNO GERSTENBERGER.
MAX HÜBSCHMANN.
ROBERT RICHTER.